US009569919B2

(12) United States Patent
Borissov et al.

(10) Patent No.: US 9,569,919 B2
(45) Date of Patent: Feb. 14, 2017

(54) ARCHITECTURE FOR SERVER-BASED CASINO GAMING MACHINE SYSTEM

(71) Applicants: Milo Borissov, Dubai Sports (AE); Rossi McKee, Indianapolis, IN (US); Manol Atanassov Roujinov, Sofia (BG)

(72) Inventors: Milo Borissov, Dubai Sports (AE); Rossi McKee, Indianapolis, IN (US); Manol Atanassov Roujinov, Sofia (BG)

( * ) Notice: Subject to any disclaimer, the term of this patent is extended or adjusted under 35 U.S.C. 154(b) by 218 days.

(21) Appl. No.: 13/865,500

(22) Filed: Apr. 18, 2013

(65) Prior Publication Data

US 2013/0296047 A1 Nov. 7, 2013

Related U.S. Application Data

(63) Continuation-in-part of application No. 13/452,393, filed on Apr. 20, 2012, now Pat. No. 9,087,430.

(51) Int. Cl.
*A63F 13/00* (2014.01)
*G07F 17/32* (2006.01)

(52) U.S. Cl.
CPC ........... *G07F 17/3225* (2013.01); *G07F 17/32* (2013.01); *G07F 17/3223* (2013.01)

(58) Field of Classification Search
CPC ............ A63F 2300/51; A63F 2300/513; A63F 2300/531; A63F 2300/57; G07F 17/3225; G07F 17/3227
USPC ........................................ 463/16, 20, 30, 31
See application file for complete search history.

(56) References Cited

U.S. PATENT DOCUMENTS 7,850,528 B2 * 12/2010 Wells ............................ 463/42
8,012,015 B2 9/2011 Alderucci
8,257,171 B2 * 9/2012 Gagner et al. .................. 463/29
8,414,391 B2 * 4/2013 Williams ........................ 463/29
2003/0104865 A1 * 6/2003 Itkis et al. ...................... 463/39
2005/0221898 A1 10/2005 Gatto et al.
2008/0274785 A1 * 11/2008 Byng et al. ..................... 463/20
2009/0036203 A1 2/2009 Anderson et al.
2010/0105455 A1 4/2010 Izumi et al.
2010/0124990 A1 5/2010 Crowder
2010/0167822 A1 * 7/2010 Crumby .......................... 463/42
2011/0053672 A1 * 3/2011 Gagner ................... G07F 17/32 463/16
2011/0269529 A1 11/2011 Baerlocher
2012/0021835 A1 1/2012 Keller et al.

* cited by examiner

*Primary Examiner* — James S McClellan
(74) *Attorney, Agent, or Firm* — Weide & Miller, Ltd.

(57) ABSTRACT

A gaming terminal has a game process layer for executing different game application and a system process layer for executing machine functions, such as controlling peripherals of the gaming terminal, wherein the game applications and system processes may be implemented using different protocols. The gaming terminal also includes a game server and a control server which may communicate with one another via an integration or translation protocol. The gaming terminal can thus execute generic game code or game code configured in accordance with varying protocols from different vendors rather than a single, proprietary protocol, and can still use a single unique system protocol for controlling the machine functions.

11 Claims, 5 Drawing Sheets

ARCHITECTURE FOR SERVER-BASED CASINO GAMING MACHINE SYSTEM

RELATED APPLICATION DATA

This application is a continuation-in-part of U.S. application Ser. No. 13/452,393, filed Apr. 20, 2012.

FIELD OF THE INVENTION

The present invention relates to server-based casino gaming machines and systems.

BACKGROUND OF THE INVENTION

Traditional casino-style slot machines, such as slot and video poker machines, were configured as independently-operable machines. For example, each slot machine was configured with a set of reels and a controller which determined an outcome or stopping position for the reels. Each video poker machine was configured with a controller which caused game information, such as images of cards, to be determined and displayed on a display of the machine. The controllers of these gaming machines were configured to be "stand-alone", meaning that they were capable of generating game outcomes by themselves (i.e. without input or control by an external device or system). For example, the gaming controller of a video poker machine might include a random number generator for randomly determining game outcomes and software for generating images of cards based upon each randomly determined outcome. FIG. 1A illustrates such a configuration wherein a first stand-alone gaming machine is configured to present a slot game and a separate stand-alone gaming machine is configured to present a video poker game.

One advantage of the configuration of these traditional gaming machines is that they can easily be set up to operate anywhere. In particular, because they machines are free-standing, they do not need to be connected to other machines or systems. However, these machines have various disadvantages. For example, because the gaming machines are custom-created to present one or more games in a stand-alone fashion, the gaming machines can only present those one or more pre-defined games. Thus, if new and more exciting games are developed, the existing gaming machines cannot be configured to present those new games without entirely re-configuring or re-programming the machines. Also, because each gaming machine must include all of the components necessary to present games in a free-standing manner, each gaming machine is very complex and expensive.

In recent years, server-based gaming systems have been developed. FIG. 1B illustrates one example of such a system. As illustrated, these systems include one or more main game servers and a plurality of gaming machines which are linked to the game server. Each gaming machine may be configured as a kiosk or terminal which communicates with the game server. This configuration has a number of advantages. First, each gaming machine may present various different games as determined by the game server (e.g. Games A, B, C . . . as illustrated in FIG. 1B). For example, the game server may include a menu of games, which menu may change over time, wherein the gaming machines may present any of the games on the menu. In one embodiment, game code corresponding to the games which are supported by the game server may be downloaded to the gaming machines from the game server, which code may be varied from time to time to permit the gaming machines to present different games. In another configuration, the gaming machines or terminals may not even require all of the game code. For example, in one configuration, the game server may execute the game code and generate corresponding game outcomes and then transmit the outcomes to the gaming machines. The gaming machines may then simply present the game outcomes to the players of those machines.

The new server-based casino gaming system thus has the advantage that new games can be implemented more quickly. As indicated above, traditional gaming machines could only present new games by taking the machines out of service and then completely reconfiguring and/or reprogramming them to present a new game or games. In the server-based model, software for a new game may be associated with the game server so that it can be executed by the game server or so that it the game code is accessible to (such as for download to) each server-based gaming machine.

In addition, because traditional gaming machines were custom-configured by their manufacturer, it was difficult for third parties to get new casino games implemented, thus limiting the number of new casino-style games which made it into the market. In particular, to even get a new game into the market, a developer of a new game generally had to have a gaming machine manufacturer develop the game for implementation on its own machines. However, even if the gaming machine manufacturer was willing to introduce the new game, given that all development was performed by the gaming machine manufacturer, the development time of the game could be many years.

An oft-stated advantage of the server-based gaming system that was frequently touted was that third parties would be able to easily create new games for implementation by the system. However, this has not generally been true. In particular, currently, each gaming machine manufacturer has developed their own unique and proprietary server-based platform/architecture which integrates the game and machine/system functions. This proprietary platform ensures, for example, that game code which is run at the gaming machine allows the gaming machine to both present game information and integrate with the various associated peripheral devices, systems and functions of the gaming machine.

This requires, however, that all game software be specifically coded for a specific manufacturer's platform. For example, an outside game content developer is required to code their game software to certain specifications so that it will run on one gaming manufacturer's platform (such as for presentation of the game at gaming machines at one casino) and then must code the same game software an entirely different way so that can be implemented on a different gaming manufacturer's platform (such as for presentation of the game at gaming machines at a different casino). This is time consuming and costly. In addition, this generally requires that the game developer turn their game code over to the system operator so that it can be integrated onto the game server, as illustrated in FIG. 1B. At that point, the game developer loses control of their game software. This makes it difficult for the game developer to know how and when their software is being used or to make changes to the software, such as to implement new and exciting game features.

SUMMARY OF THE INVENTION

Aspects of the invention comprise a server-based gaming system, gaming machines or terminals, an architecture for a server-based gaming system, and methods of playing and presenting server-based games.

One embodiment of the invention includes a server-based gaming system which comprises a plurality of gaming machines or terminals, at least one gaming terminal control server or manager, and one or more game servers. In a preferred embodiment of the system, game processes and system/machine processes are separated. The gaming terminals have a separate game process layer and machine or system process layer.

In one embodiment of the invention, game information such as game outcome information, is generated by the game servers and transmitted to the gaming terminals. The game process layer utilizes the game information to present game information to the player, such as by displaying game information on a video display of the terminal. Importantly, the game process layer is configured to execute or utilize game information which may be provided in a plurality of different protocols or formats, including, but not limited to, one or more different non-proprietary or proprietary formats.

Machine or system processes at the gaming terminal are segregated from the game processes. In one embodiment, machine processes which are associated with the game are triggered by instructions which are transmitted from the game server to the terminal control server. The terminal control server preferably transmits control instructions (such as after a transaction) to the system process layer of the gaming terminal. The system process layer utilizes those instructions to control machine processes, such as to control peripherals at the gaming terminal.

At the same time, machine processes which are generated at the gaming machine and which relate to the game, such as a player input, may be routed from the system process layer of the gaming terminal to the terminal control server. The terminal control server then routes information regarding such input or processes to the game server which is generating the game information (such as after a translation of the system process layer input to an input usable by the game server).

In accordance with the invention, integration of game processes and system or machine processes is accomplished via the terminal control server, rather than by having the game code be compatible with machine or control instructions. Thus, game content can be provided from different game servers which are associated with different game vendors. Each game vendor can generate and provide their own game code in accordance with one or more well known, public and/or non-proprietary protocols or configurations. Different vendors may supply game code which utilizes different protocols or formats.

In accordance with another embodiment of the invention, a gaming terminal has an embedded game server and terminal control server, such as implemented via software executed at the gaming terminal. The control server implements the functionality of an external terminal control server, while the game server communicates with the game process layer of the gaming terminal and the associated various game applications. In this embodiment, the game server and the control server may communicate with one another via an integration or translation communication protocol, such as implemented via the terminal control server within the gaming terminal. In this configuration, the gaming terminal may be operated in a stand-alone configuration and yet still utilize game applications from many vendors and game applications which are not specifically coded to a particular system protocol of the gaming machine.

Further objects, features, and advantages of the present invention over the prior art will become apparent from the detailed description of the drawings which follows, when considered with the attached figures.

DETAILED DESCRIPTION OF THE INVENTION

Figure 1A:
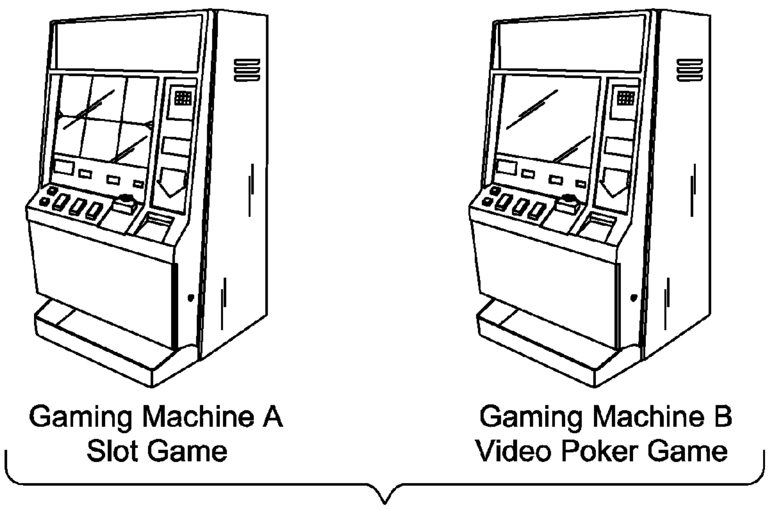
FIG. 1A illustrates stand-alone gaming machines in accordance with the prior art.
Figure 1B:
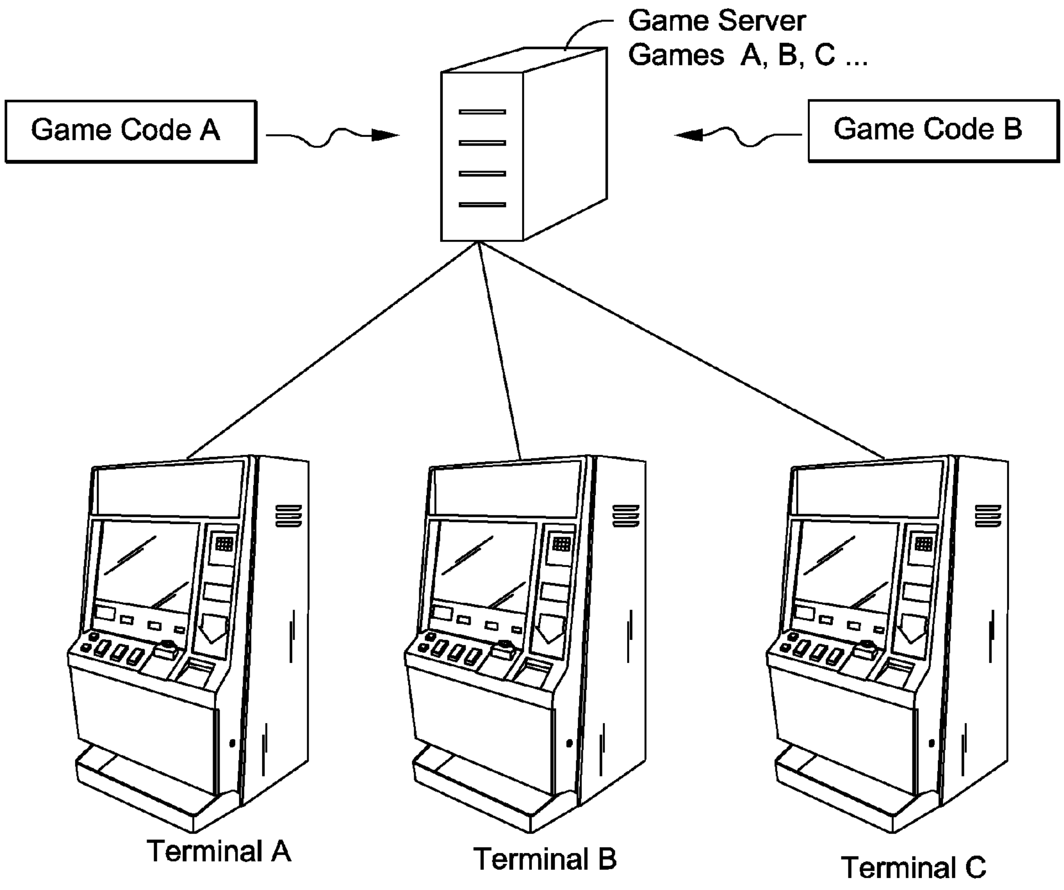
FIG. 1B illustrates one configuration of a server-based game system in accordance with the prior art.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a server-based gaming system, configurations of gaming machines or gaming terminals, an architecture for a server-based gaming system, and methods of playing and presenting server based games. In one configuration, the gaming system includes a plurality of gaming machines or terminals, at least one gaming terminal control server or manager and one or more game servers. In accordance with the architecture, game processes and system/machine processes are separated. This allows the gaming terminals to execute generic game code or game code configured in accordance with varying protocols, rather than a single, proprietary protocol.

In other words, the exemplary gaming terminals described herein are configured to create a layer of abstraction between physical hardware (i.e., the system process layer) and game software (i.e., the game process layer). The abstraction layer enables the development of hardware platform agnostic, or cross-platform, game software that can be executed with little or no modification on a variety of different hardware platforms. For example, game inputs (such as button presses) and wagering activities (such as inserting currency) may be provided to the game software via the abstraction layer. Wagering payouts and other outputs may similarly be provided by the game software to the gaming terminal via the abstraction layer.

The abstraction layer may be implemented at the gaming terminal and/or the terminal control server. The abstraction layer facilitates communication between the system process layer of the gaming terminal with the game process layer of the gaming terminal by providing communication endpoints and translation between the endpoints. More particularly, the terminal control server may provide one or more application programming interfaces (APIs) with which the system process layer and the game process layer may communicate. By using such interfaces, game designers can program a game with reference to the API but without regard to the underlying hardware or infrastructure, thus achieving increased platform independence.

One embodiment of the present invention will be described with reference to FIG. 2. As illustrated, a gaming system 20 includes at least one gaming machine or terminal 22. In a preferred embodiment, the gaming terminals 22 are configured to present casino-style games, namely games which are played for a monetary wager (or monetary equivalent, such as credit) and which offer the potential to lose the wager (for a losing game outcome) or win winnings (for a winning outcome). As described below, such may comprise any of a variety of games now known or later developed, including slot-type games, video poker type games, and others.

The gaming terminal 22 may have a plurality of features. For example, the gaming terminal 22 may include a housing or cabinet 24 for enclosing/supporting various components of the terminal. The housing 24 may have a variety of configurations. In one embodiment, as illustrated, the housing 24 is configured so that the machine has an "upright" configuration. The casino gaming terminal 22 might also be configured as a "slant"-type, "bar-top" or have other forms.

In one embodiment, the gaming terminal 22 is preferably configured as a "video" type terminal, the terminal including at least one display 26 for displaying game information to a player. The gaming terminal 22 may include other means for providing information to a player. For example, speakers (not shown) or other devices may be provided for generating sound associated with the game. The gaming terminal 22 may also include lights, printed instructions and other displays/display devices.

As indicated above, the games presented by the gaming terminal are preferably wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming terminal 22 may thus include a bill validator/acceptor 28 for accepting paper currency and/or a coin acceptor 30 for accepting coins. Other means of payment, such as a credit card reader, may be provided. An award of winnings in the form of coins may be paid to the player via a coin tray 32.

Preferably, the gaming terminal 22 includes means for a player to provide input. In one embodiment, this means comprises one or more buttons. For example, one or more wager buttons 34 may be provided for a player to select the amount to bet on a particular game or make other game inputs, such as selecting cards to hold/discard or the like. Other means of input may be provided, such as a touchscreen display and other devices now known or later developed.

A game controller (not shown) is provided for controlling the various devices of the gaming machine and for generating game information. For example, the game controller may be arranged to generate video and audio data for presentation by the display and speakers of the gaming terminal 22. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The gaming terminal 22 may include one or more random number generators ("RNG") for generating random game events and results (such as cards used in a card game, slot symbol positions or the like). As described below, however, in other configurations the gaming terminal 22 need not contain a RNG, such as if a remote game server includes an RNG and generates the game results, or may have an RNG along with a remote server or other device.

As indicated, in one embodiment, game information is displayed by a video display 26 to a player. The display 26 may be of a variety of types, including CRT, LCD, plasma and others. The gaming terminal 22 may also include more than one video display.

The gaming terminal 22 may have other configurations, including other features. For example, the gaming terminal 22 may include a player tracking device, such as a card reader 36 and associated keypad 38. Such player tracking devices are well known and may permit the game operator to track play of players of the gaming machine. The tracked play may be utilized to offer player bonuses or awards.

In one embodiment, the gaming terminal 22 may be configured to dispense media, such as printed paper tickets, magnetic stripe or RFID tagged-media which have associated value. For example, winnings or unused credits may be returned to the player via a printed ticket or card having value or associated value. In one embodiment, the gaming terminal 22 might also be configured to accept such media for providing credit for game play.

As indicated above, the gaming terminal 22 is preferably configured to present one or more casino-style games. Such games may comprise a variety of games which are currently known or which may be developed in the future. Such games include, but are not limited to, lottery, keno, bingo, poker, slot and other games.

In a preferred embodiment, as described in detail below, the gaming terminal 22 is configured to present one or more games based upon game information which is provided by at least one external device, such as an external game server. Depending upon the configuration of the system, the configuration of the gaming terminal 22 may vary. For example, if the external game server is configured to provide the gaming terminal 22 with executable game code or software, then the gaming terminal 22 preferably includes one or more data storage or memory elements for storing the code or software, a controller for executing the code and at least one random number generator for use in generating random game results. On the other hand, if the external game server were configured to generate game results and transmit those results to the gaming terminal 22 for presentation, the gaming terminal 22 might have another configuration (such as, for example, not including a random number generator).

It will be appreciated that the system 20 may include a plurality of gaming terminals 22. For example, multiple gaming terminals 22 might be located on a casino floor. Of course, the gaming terminals 22 might be used in other environments, such as an airport, a bar or tavern or other locations.

As used herein, the term "gaming terminal" may also include other types of gaming machines or devices other than that described above. Such might comprise, for example, gaming tables. Such tables may be manually operated or be fully or partially automated. A variety of games may be offered at such tables. Of course, the gaming machines may include other types of devices as well, including hand-held, portable or other types of devices such as tablets, laptops and other electronic devices now known or later developed.

In one embodiment, the system 20 includes at least one gaming terminal control, such as a gaming terminal control server 40 (which may be referred to herein as a server-based game (SBG) or video lottery terminal (VLT) server). Additional details regarding the terminal control server 40, including its functionality, are provided herein. However, in one embodiment, the terminal control server 40 comprises a computing device which comprises at least one processor for receiving information, for processing information or executing code or software, and for generating an output, such as control instructions.

In one embodiment, the terminal control server 40 includes means for storing information or instructions. Such means may comprise one or more memory devices. Such might comprise RAM, ROM (including EPROM, EEPROM, PROM) or other devices now known or later developed. The terminal control server 40 might include one or more other memory devices, such as for storing game state information or the like, as detailed below. In one embodiment, the terminal control server 40 might comprise or be in communication with one or more mass data storage devices, such as one or more hard drives or the like.

The terminal control server 40 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

The terminal control server 40 might actually comprise a system or network of a plurality of elements or devices. For example, the terminal control server 40 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the terminal control server 40, such as to change operator settings and the like. The terminal control server 40 might also comprise a router and one or more separate computing devices. The functions of the various computing devices might be segregated.

In a preferred embodiment, the one or more gaming terminals 22 are in communication with the at least one terminal control server 40 at one or more times. For example, the gaming terminals 22 and the at least one terminal control server 40 may be linked via one or more communication links 42. These communication links 42 may be wired and/or wireless and may be dedicated, shared, part of a LAN, WAN or other network, including the Internet.

In one embodiment, the system 20 also includes one or more game servers 44. As with the terminal control server 40, the game servers 44 preferably comprise computing devices which comprise at least one processor for receiving information, processing information or executing code or software, and generating an output, such as control instructions.

In one embodiment, each game server 44 includes means for storing information or instructions. Such means may comprise one or more memory devices. Such might comprise RAM, ROM (including EPROM, EEPROM, PROM) or other devices now known or later developed. In one embodiment, the game server 44 might comprise or be in communication with one or more mass data storage devices, such as one or more hard drives or the like.

The game server 44 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

Each game server 44 might actually comprise a system or network of a plurality of elements or devices. For example, the game server 44 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the game server 44, such as to change operator settings and the like. The game server 44 might also comprise a router and one or more separate computing devices. The functions of the various computing devices might be segregated.

Although additional details of the game servers 44 are described herein, in general, the game servers 44 are configured to provide the gaming terminals 22 with executable game code or software, game results and/or other game information for use by the gaming terminals 22 in presenting one or more games to one or more players.

In this regard, the one or more gaming terminals 22 are in communication with the one or more game servers 44 at one or more times. For example, the gaming terminals 22 and the one or more game servers 44 may be linked via one or more communication links 46. These communication links 46 may be wired and/or wireless and may be dedicated, shared, part of a network 48, such as a LAN, WAN or other network, including the Internet. As disclosed herein, in one embodiment of the invention, a vendor game server 44 can be intermediate the gaming terminal 22 and terminal control server 40, or such might be integrated or the like as described below. It is contemplated that any network topology or infrastructure may be used to communicatively couple together the gaming terminals 22, the game servers 44, and/or the terminal control server 40.

As described herein, a particular advantage of the invention is that it permits different game vendors to present games on gaming terminals 22 which belong to a third party. For example, relative to the system 20 illustrated in FIG. 2, a plurality of gaming terminals 22 may be located on the floor of a casino. The gaming terminals 22 may be owned or leased by the casino. Likewise, those gaming terminals 22 may be linked to one or more terminal control servers 40 which are located at the casino, such as in a back room.

In one configuration, the gaming terminals 22 and at least one terminal control server 40 may be supplied by a particular gaming manufacturer and thus have particular operating characteristics. In accordance with the invention, one or more of the game servers 44 may be provided by the gaming manufacturer or casino or be operated by the gaming manufacturer or casino. Most importantly, however, one or more of the game servers 44 may be operated by one or more third party vendors (other than the casino or manufacturer/operator of the gaming terminals 22 and terminal control server 40). For example, as illustrated in FIG. 2, a Vendor A may operate a first game server, a Vendor B may operate a second game server and a Vendor C may operate a third game server. Each of these vendors may develop and supply their own game code to the gaming terminals 22, whereby each vendor's games may be presented on those terminals.

Additional aspects of the system will be described with reference to FIG. 3. In accordance with a preferred embodiment of the invention, the system 20 is configured so that the game processes and system or machine processes associated with a gaming terminal 22 are segregated. In general, this permits the game processes to be independent from the system processes. As described herein, this has numerous advantages.

Figure 3:
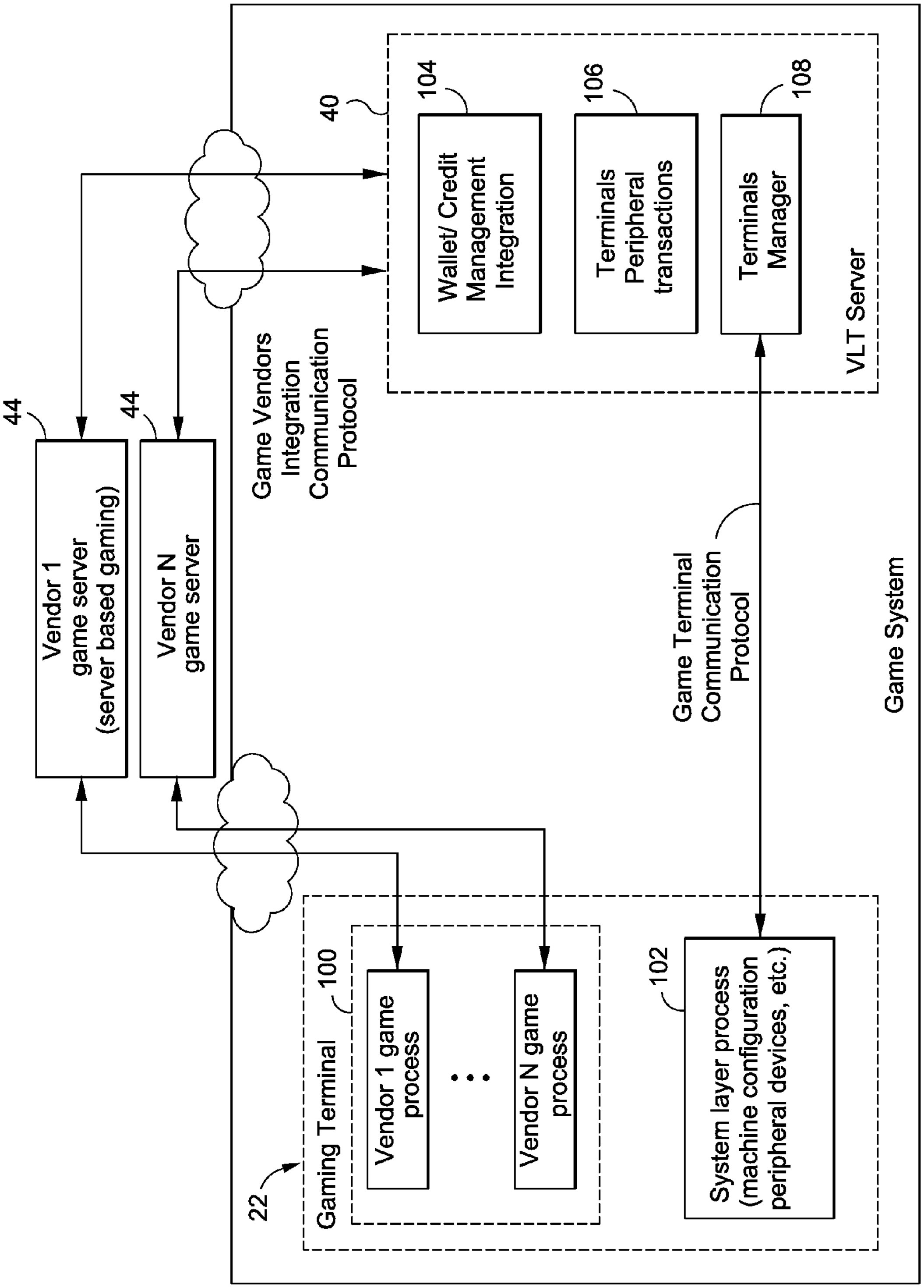
FIG. 3 diagrammatically illustrates operation of a gaming system in accordance with the present invention.

As illustrated in FIG. 3, a gaming terminal 22 has a game process layer 100. The game process layer 100 may be implemented as hardware or software, such as by software which is executed by the gaming controller of the gaming terminal 22. In one embodiment, the game process layer 100 comprises a platform which permits the gaming terminal 22 to execute game code in a variety of formats, configurations or protocols, such as well-known generic formats or configurations such as Adobe FLASH, HTML, Java, Javascript, and others. Preferably, the game process layer 100 is configured to execute or implement game code for presenting a game, including generating game information for presentation to the player of the gaming terminal. Such information may comprise, for example, image information for display by the video display of the gaming terminal.

The game process layer 100 may be implemented as one or more virtual machines, such as the Java virtual machine, or any other run-time environment. The game code may be provided as executable code, bytecode, or code to be interpreted, compiled, or executed by the game process layer 100. The game process layer 100 may be programmed to use game code in two or more formats.

The gaming terminal 22 also has a system process layer 102. The system process layer 102 may be implemented as hardware or software, such as by software which is executed by the gaming controller of the gaming terminal 22. In one embodiment, the system process layer 102 comprises a platform for controlling the gaming terminal 22 and executing game-supporting functionality. As described herein, such may comprise the control of the various peripheral devices of the gaming terminal 22 (such as the buttons 34, card reader 36, bill validator 28 such as illustrated in FIG. 2), executing accounting, player tracking and other functions, such as tracking monetary credits at the gaming terminal 22, executing "cash-out" and other functions which are associated with the operation of the gaming terminal 22.

As illustrated, game code or game information may be provided to the gaming terminal 22 by a plurality of vendors. For example, a Vendor 1 may utilize a game server 44 for providing game code or game information corresponding to one or more Vendor 1 games. Likewise, other vendors may utilize one or more game servers 44 for providing game code or game information corresponding to their games.

In some embodiments, one or more game assets (such as graphics, videos), game updates, and/or game components may be made available separately from the game code. For example, if the game code is implemented in Flash, the game code may use references such as Uniform Resource Locators (URLs) to refer to graphics for use in the game. The graphics may be stored and retrievable at the game server 44, e.g., via HTTP, etc., or at a different server, such as a web server (not shown).

In a preferred embodiment, the game information includes information regarding the outcomes of one or more games. In particular, game outcomes are preferably generated by the game servers 44 and are transmitted to the gaming terminals 22. The gaming terminal 22 uses the outcome information to present the one or more games. As one example, a vendor may transmit base game information regarding a game from their game server 44 to a gaming terminal 22. Such information might comprise the images of cards, slot symbols or other indicia, entire page displays, graphical user interface information or the like. The gaming terminal 22 may utilize such game information, along with game outcome information, to display or present a game to a player. For example, a game server 44 may transmit image files corresponding to a game interface and various cards. The game server 44 may also transmit a game outcome, such as data which represents the game outcome of a "Full House" win comprising the cards "A♦, A♥, K♣, K♥, K♠" to the gaming terminal 22. The game process layer 100 of the gaming terminal 22 may utilize that game outcome information and the card image information to display those cards on the display of the game terminal to the player.

Figure 2:
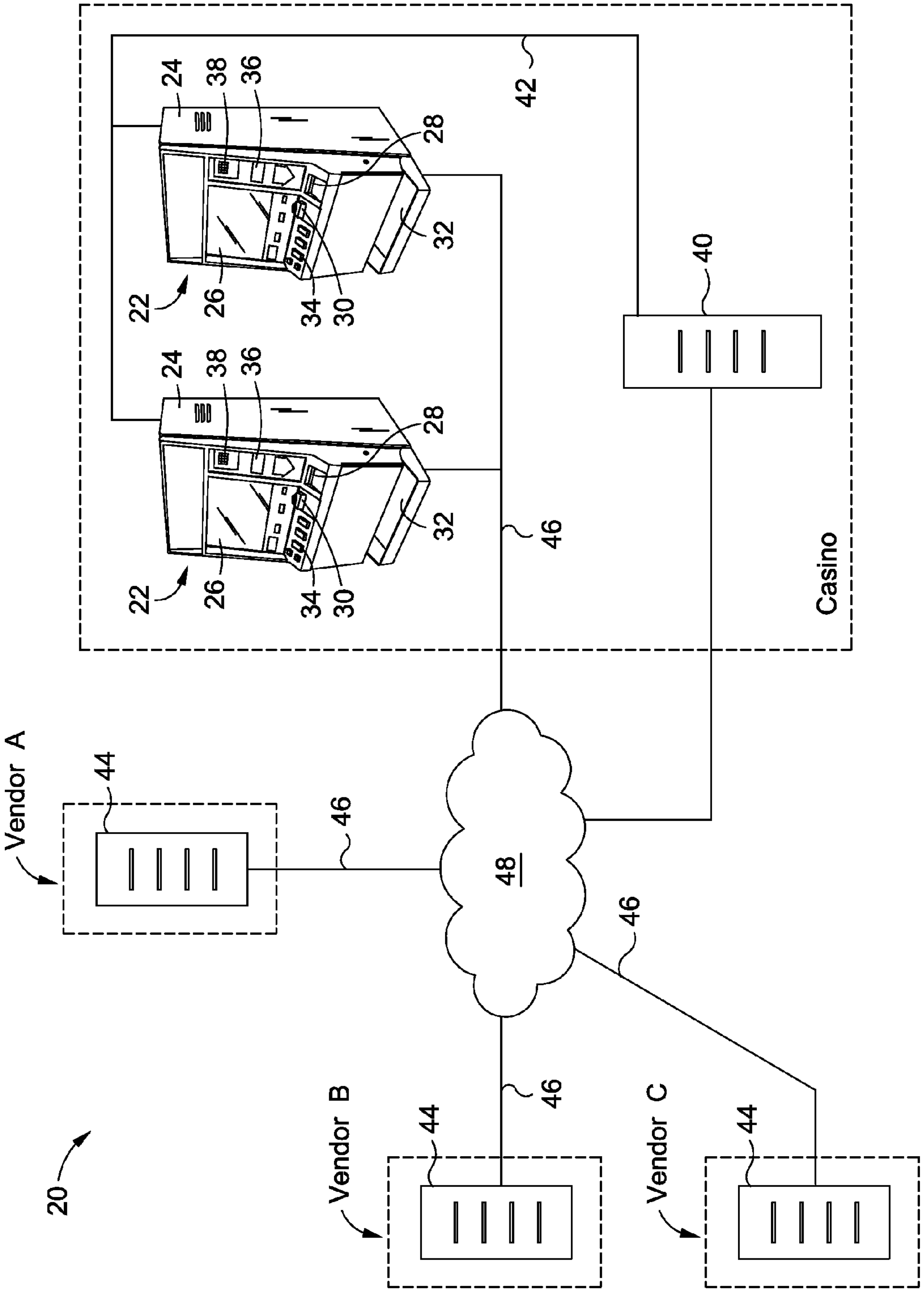
FIG. 2 is a block diagram of a gaming system in accordance with the present invention.

In a preferred embodiment of the invention, each vendor's game code corresponding to one or more games may be downloaded to the gaming terminal 22, such as via the above-described communication link 46 (shown in FIG. 2). That game code is preferably associated with the game process layer 100 of the gaming terminal 22. As illustrated in FIG. 3, a gaming terminal 22 may thus have the game code from multiple different vendors associated with, and executing synchronously or asynchronously within, its game process layer 100.

Most importantly, the vendor's game code does not have to be coded in accordance with a proprietary gaming machine standard or a standard that makes the game code compatible with the system protocol or functionality of the gaming terminal 22. Instead, the vendor's game code may merely be coded in accordance with one or more generic and/or widely recognized standards or formats. Further, the gaming terminal 22 may accept game code from different vendors, which sets of game code are not coded in accordance with the same standard or format. For example, Vendor A's game code may operate using Adobe FLASH while Vendor B's game code may operate using HTML standards, such as HTML 5.

In some embodiments of the invention, the game process layer 100 and the system process layer 102 are not linked at the gaming terminal 22. Instead, integration of the game and system functionality occurs at or via the terminal control server 40.

As illustrated in FIG. 3, the system process layer 102 of the gaming terminal 22 communicates with the terminal control server 40. In a preferred embodiment, the system process layer 102 may implement or employ a proprietary protocol, such as a gaming terminal system control and communication protocol. This protocol is preferably compatible with the terminal control server 40.

As also illustrated in FIG. 3, the game process layer 100 of the gaming terminal 22 also communicates with the terminal control server 40. As illustrated, such communications are preferably via the vendor's game server 44. In one embodiment, the communications are according to an "integration" protocol or the communications are "translated" at the terminal control server 40.

For example, in one embodiment, Vendor 1 may code their game code in accordance with an HTML standard. When a Vendor 1's game is presented at a gaming terminal 22, the gaming terminal 22 may communicate game activities to Vendor 1's game server 44. Vendor 1's game server may implement a translation engine which translates the game activity information into a standardized integration protocol. That translated information may then be transmitted to the terminal control server 40 for use by the terminal control server 40 in controlling the gaming terminal via the system process layer 102 of the gaming terminal 22.

Of course, each vendor may employ a different translation engine or more than one translation engine which permits their particular game code to integrate with the terminal control server 40.

In another embodiment, direct communications could occur between the game process layer 100 of the gaming terminal 22 and the terminal control server 40. In such a configuration, the terminal control server 40 could employ or implement one or more translation engines. For example, activity information relating to a game that is implemented via HTML might be translated with a first engine or translator at the terminal control server 40, while that which is implemented using Adobe FLASH might be translated with a second engine or translator at the terminal control server 40.

Thus, regardless of the format that the game code is in, communication between the game process layer 100 and the system layer process 102 becomes possible via translation and common communication protocols. The various games communicate with game servers 44 using protocols selected by the vendors. At the game server 44, information from the games in the game process layer 100 is communicated in a pre-determined protocol to the terminal control server 40. Accordingly, the game server 44 may provide translation from the vendor's protocol (used to communicate between the game and the game server) to the pre-determined protocol (used to communicate between the game server 44 and the terminal control server 40). The terminal control server 40 communicates with the system layer process 102 using a protocol that may be unique to the gaming terminal 22 and/or the system process layer 102. In other words, the gaming terminals 22 may be produced by different manufacturers or have different hardware configurations and may use a variety of communication protocols. The terminal control server 40 is configured to communicate with each of these gaming terminals 44 using an appropriate protocol, which may be determined using a database of gaming terminals as described herein. Thus, communication from the game process layer 100 to the system process layer 102 may be translated zero, one, two, or more times as data passes between the various components and such components provide translation services between disparate communication protocols.

Communication from the system process layer 102 to the game process layer 100 happens similarly as the process is reversed from game process layer 100 to the terminal control server 40 to the game server 44 to the game process layer 100. Translation between protocols may happen as required.

A "protocol" as used herein may refer to any combination of standards, languages, etc. used at any level of a communication stack or communication model, such as the Open Systems Interconnection (OSI) model. More particularly, a protocol may include physical, data link, network, transport, session, presentation, and/or application layer standards. Translation from one protocol to another may include translation of one or more of such layers. For example, the game process layer 100 may communicate with the game server 44 using SOAP/HTTP via TCP/IP over 802.11. After translation, the game server 44 may communicate with the terminal control server 40 using remote procedure calls via TCP/IP over 802.3 (i.e., Ethernet). It should be appreciated that communications using compatible layers may still require translation. For example, translation may be required from one SOAP-based protocol to another, incompatible, SOAP-based protocol that uses different XML syntax.

In some embodiments, as indicated above, the game and system activities associated with the gaming terminal 22 are linked at the terminal control server 40. A variety of examples will illustrate this aspect of the invention.

As one example, Game A belonging to Vendor 1 may be implemented by the game process layer 100 of the gaming terminal 22. As a result of a game win of that game, the player may be awarded 500 monetary credits. As will be appreciated, the game code which is executed in the game process layer 100 may present the game win and winning award. The winning outcome and award may be determined by Vendor 1's game server 44. Vendor 1's game server 44 may translate the 500 credit win and transmit that information to the terminal control server 40 (or such information might be transmitted to the terminal control server and then be translated). The terminal control server 40 may utilize this information to transmit a control instruction (using a gaming terminal communication protocol) to the system process layer 102 of the gaming terminal 22, such as to cause the gaming terminal 22 to indicate a new credit balance on the video display of an additional 500 monetary credits.

As another example, a player may wish to play Game B belonging to Vendor 2. During the game the player may be required to provide input regarding a selection of one or more playing cards. The player may depress a button of the gaming terminal 22. This input may be detected by the system process layer 102 of the gaming terminal 22 and then be transmitted to the terminal control server 40. The terminal control server 40 may either translate the input or transmit that input to Vendor 2's game server 44, at which point the input is translated to the appropriate game protocol and then transmitted to the game process layer 100 of the gaming terminal 22. The game may thus accept the player's input and, in response to that input present the next portion of the game.

It will be appreciated that a wide variety of features and functions may be implemented in the above-described fashion and that the terminal control serer 40 may include various engines or managers for integrating the game and system functions. For example, as illustrated in FIG. 3, the terminal control server 40 may include a wallet/credit management engine 104, a peripheral management engine 106 and a terminals manager 108. The wallet/credit management engine 104 may, for example, translate and manage monetary actions associated with the gaming terminal 22, including acceptance of currency, coins, monetary value tickets, coded financial cards, or other financial instruments or devices, the wagering of credits by a player and the award of winnings as a result of game play or otherwise. The peripheral management engine 106 may manage or control the various peripheral devices of each gaming terminal 22, including the displays, buttons, touch-screens, bill validators, card readers, scanners, currency issuing devices, keypads and other devices. Such engines may comprise combinations of hardware and/or software, such as a main processor which executes software modules corresponding to each of said engines. The terminals manager 108 may be configured to coordinate communication between gaming terminals 22 and the terminal control server 40. The terminals manager 108 may manage the associations between gaming terminals 22 and the terminal control server 40 by adding and removing gaming terminals 22 from a database of gaming terminals. The database of gaming terminals (not shown) may store network addresses, hardware configurations, physical locations, etc. of each gaming terminal 22 associated with the terminal control server 40. Accordingly, the terminal control server 40 may adapt its communications with each gaming terminal 22 based on data in the database of gaming terminals.

It will be appreciated that the system 20 and the various elements thereof may have various configurations in accordance with the invention. For example, while the system 20 illustrated in FIGS. 2 and 3 have third party vendor servers 44, it is possible for the casino or gaming terminal or system manufacturer to also operate one or more game servers for providing game content. For example, a casino might operate their own game server to enable the casino to directly associate their own games with their gaming terminals 22 (such as in addition to games which are offered by third party vendors).

The system 20 might also include a variety of additional features or elements or connect to other devices or systems. For example, a casino may operate a player tracking system which utilizes one or more player tracking servers to track player game play, as is well known in the art. The terminal control server 40 may communicate with a player tracking server or system, such as to report aspects of player game play at a gaming terminal 22. As another example, a casino may operate an accounting system which includes one or more accounting servers to track monetary amounts which are provided to gaming terminals 22, credits which are wagered, credits which are won and/or the movement of credits or monies between gaming terminals 22. Once again, the terminal control server 40 may communicate with such a server or system, such as to report a player's wagering of credits at a gaming terminal 22 or the award of winnings to a player as a result of game play.

As indicated above, the invention has application to gaming terminals 22 other than casino-style gaming machines. For example, the system of the invention may be utilized to present one or more games to a player who is utilizing a mobile or portable electronic device. Such devices might include, but are not limited to, a laptop, PDA or tablet. In one configuration, a player may download game code which enables the mobile or portable electronic device to present games in similar fashion to that described above (in such a configuration, the mobile or portable electronic device may have one or more wireless communication links to other devices, such as to a game server and a terminal control server.

In one embodiment, a casino, hotel or other entity might provide such devices to players, such as by checking them out at a front desk or the like. Further, such entities might cause other information to be presented to players. For example, a hotel might operate its own game server 44. A player using a hotel tablet might access games from multiple third party vendors. At the same time, the hotel may utilize their game server 44 to present music, hotel information or other media to the player.

As indicated above, the gaming terminal 22 may be linked to a player tracking server or system, such as through the terminal control server 40. Of course, the same may be true if the gaming terminal 22 comprises such a handheld or mobile electronic device. For example, such a handheld or mobile electronic device could link to a player tracking system or server via a communication link with the terminal control server 40 or via another communication link and/or interface. In such a configuration, the handheld or mobile communication device could be multi-functional to serve as both a player tracking device and present one or more games via the remote game servers 44 (for example, the handheld or mobile communication device may be linked to or identify a specific player, whereby any play of games by the player using the device thus identifies the player; further, player rewards, promotions and the like may be directed to the player by directing such to the handheld device which is assigned to that player).

In one embodiment, the system and method of the invention may be utilized to permit a player to play more than one game at a time (i.e. two or more games simultaneously or overlapping in time). Further, those games might be provided by two or more different game vendors. For example, a single player at a gaming terminal 22 might simultaneously play a first game associated with a first game vendor and a second game associated with a second game vendor (wherein, as described above, game information regarding the two games may be provided by two separate game servers 44 to the single gaming terminal 22).

Regardless of the configurations of the gaming terminals 22 (i.e. whether they are casino-style gaming machines, mobile electronic devices, kiosks or the like), management of credit or monetary value transactions may be centralized. As indicated above, the monetary value transaction management (tracking of monies input to the gaming terminals 22, credits wagered and won by players at the gaming terminals 22, monetary value or credits which are associated with player accounts when such accounts exist, etc.) may all be centralized at the terminal control server 40. As indicated above, the terminal control server 40 may directly manage monetary value transactions, such as via a wallet/credit management engine 104. In other embodiment, all monetary value transaction information may be routed through the terminal control server 40 to one or more external management devices, such as an existing casino accounting system or a third party accounting system or the like.

Figure 4:
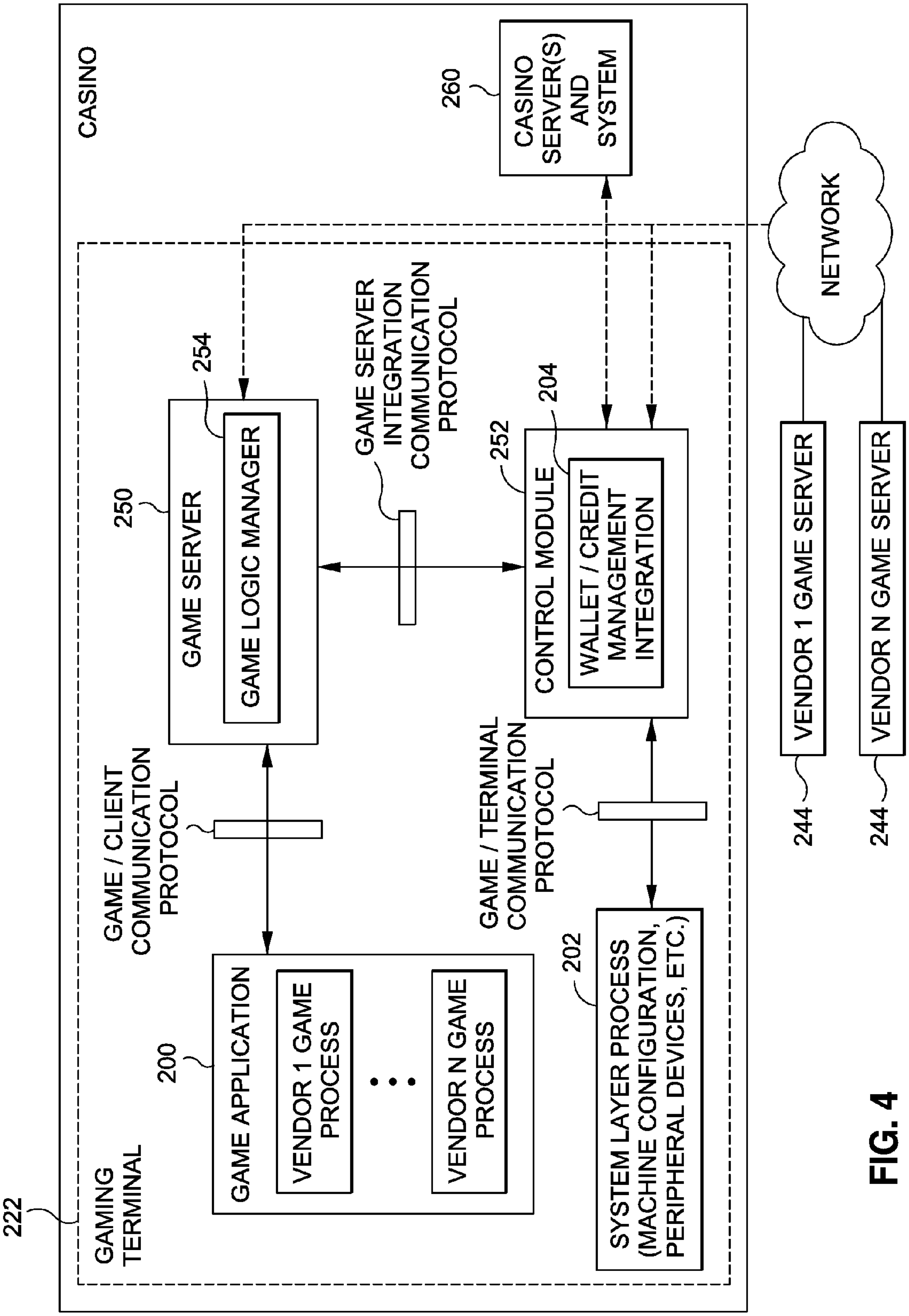
FIG. 4 diagrammatically illustrates operation of another embodiment gaming system in accordance with the invention.

Another embodiment of the invention is illustrated in FIG. 4. In this embodiment, the gaming terminal (such as a video lottery terminal or a server based game terminal) 222 again has a game process layer 200 and a systems process layer 202. In this embodiment, however, the game process layer 200 and the systems process layer 202 are linked at the gaming terminal 222.

In this embodiment, a game server 250 and a video lottery terminal (VLT) or server based game (SBG) control module 252 are located at the gaming terminal 222, such as by being embedded at or implemented at the gaming terminal 222. The game server 250 and VLT/SBG control module 252 preferably comprise one or more software applications (e.g. executable machine-readable code) at the gaming terminal 222. For example, the game server 250 and VLT/SBG module 252 may each comprise one or more software applications which are stored at a memory device of the gaming terminal 222 and which are executable by one or more processors of the gaming terminal 222.

The game server 250 may comprise or include a game logic manager 254. The game logic manager 254 may serve as an interface between different game processes or applications which are being executed in the game processes layer 200 of the gaming terminal 222, and the VLT/SBG module 252. For example, the game logic manager 254 may be configured to determine which of one or more different integration protocols apply to different game processes. For example, the game logic manager 254 may determine that a first integration communication protocol must be applied to a game process/application of Vendor 1, while a second, different integration communication protocol must be applied to a game process/application of Vendor 2.

In one embodiment of the invention, the game logic manager 254 communicates with the game process layer 200 of the gaming terminal 222 via a game/client communication protocol. In particular, the game logic manager 254 may be implemented via a specific protocol for the gaming terminal 222 (such as a specific gaming terminal manufacturer's proprietary protocol), while game applications may be implemented via other protocols as described above (such as one or more generic or common protocols). The game/client communication protocol may be configured to permit communications between the game logic manager 254 and the game applications when such are using different communication protocols, for example.

The VLT/SBG control module 252 may be configured to perform one or more of the functions of the terminal control server 40 which is described above and illustrated in FIG. 3. For example, the VLT/SBG module 252 may include a wallet/credit management integration module 204 (and/or other modules) in similar fashion to the wallet/credit management integration module 104 of the terminal control server 40 described above.

In similar manner to that described above relative to FIG. 3, the VLT/SBG module 252 may be configured to communicate with the systems process layer 202 of the gaming terminal 222 via a game terminal communication protocol. In this manner, the VLT/SBG module 252 may interface with the various machine or system features of the gaming terminal 222, such as the peripheral devices.

Most importantly, the gaming terminal 222 is configured to implement a game server integration communication protocol. This protocol is configured to permit communications between the game server 250 and the VLT/SBG module 252 in like manner to the configuration described above and illustrated in FIG. 3, except that the integration protocol is internal to the gaming terminal 222.

Once again, the game server integration communication protocol is preferably configured to "translate" information for exchange between the game side and the system side of the gaming terminal 222. The game server integration communication protocol may be implemented via the VLT/SBG server 252 and/or the game server 250.

In this configuration of the invention the gaming terminal 222 may be stand-alone in that it does not need to be connected to one or more separate vendor game servers or a VLT/SBG server or terminal control server to operate. In particular, game applications from one or more vendors may be loaded onto the gaming terminal 222 for execution at the game processor layer 200 of the gaming terminal 222. One or more game server integration communication protocols may also be loaded onto the gaming terminal 222 which permit transaction of the communications between the different game applications and the system layers or applications of the gaming terminal 222.

Advantageously, this configuration again permits the gaming terminal 222 to utilize one or more proprietary manufacturer system layer protocols, but still permits the gaming terminal 222 to implement game code from a variety of different vendors, where the game code is not specifically coded to the protocol of the gaming terminal. As described above, for example, the game applications may be coded based upon one or more standard or generic protocols.

In other embodiments, the gaming terminal 222 could still be connected to one or more external devices or systems. For example, the gaming terminal 222 could still be configured to receive game applications from one or more vendor game servers 244, such as via a network. In this manner, the game applications do not need to be pre-installed on the gaming terminal 222 or manually loaded onto the gaming terminal 222, but might be downloaded or updated at various times automatically via a communication link. It will be appreciated that the vendor server 244 could also be associated with or be part of the game server 250 or otherwise be part of the gaming terminal 222.

Likewise, the gaming terminal 222 might be connected to one or more casino systems 260. Such systems 260 may comprise player tracking systems, player loyalty systems, user account systems, accounting systems and the like, including various components thereof such as servers. For example, the VLT/SBG module 252 might communicate game activity to a casino accounting server for use by the server in maintaining records regarding gaming terminal 222 wagers and payouts, among other information.

Figure 5:
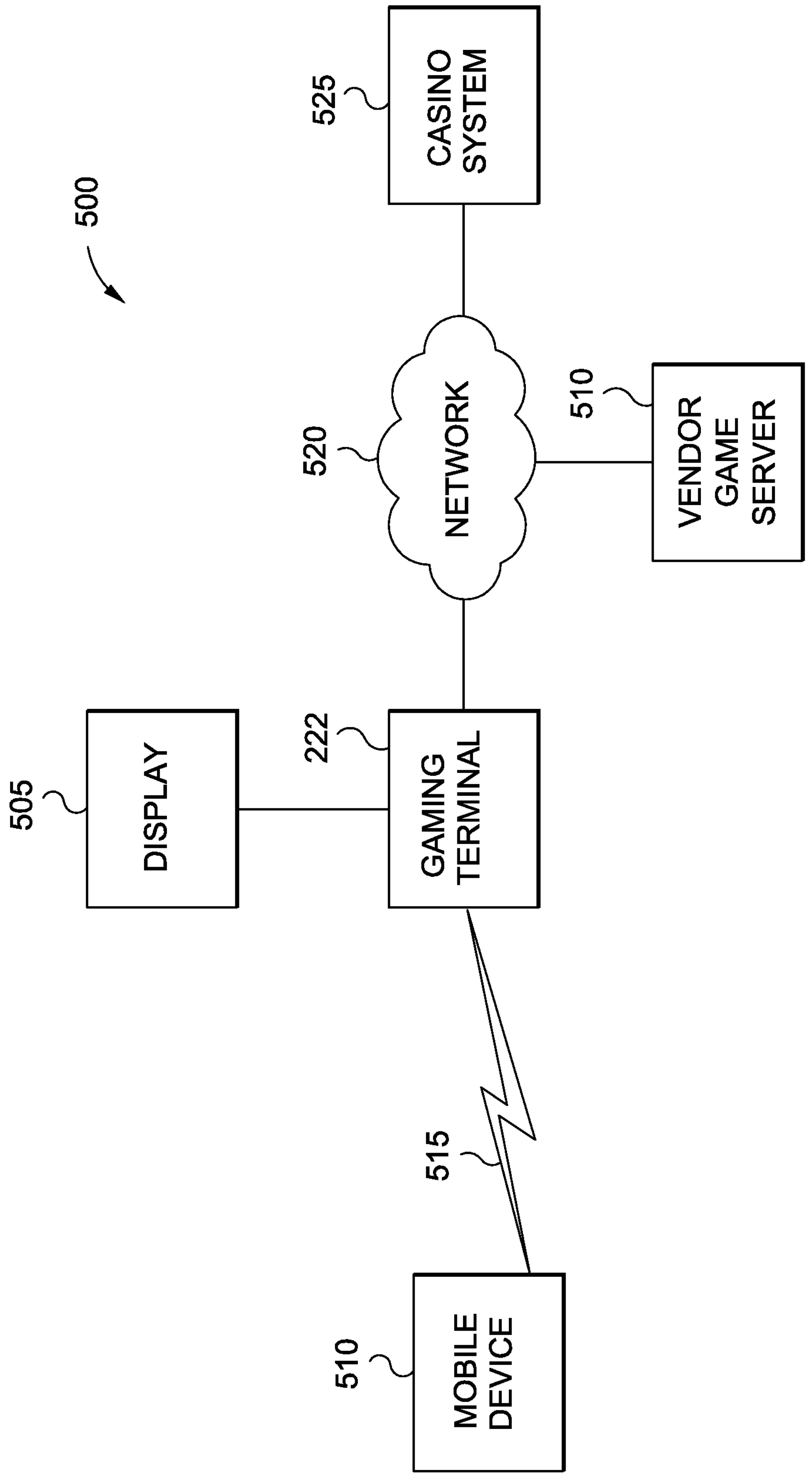
FIG. 5 is a block diagram of a system for use with the gaming system of FIG. 4.

FIG. 5 illustrates a gaming system 500 for use with the gaming terminal 222. Alternatively, the gaming system 500 may be used with gaming terminal 22. In other words, in the gaming system 500, the terminal control server may be separate from the gaming terminal or embedded in the gaming terminal. The gaming system 500 may be used as an in-room gaming system that enables hotel guests to participate in gaming and/or wagering events from a hotel room. Alternatively, or additionally, the gaming system 500 may be used in any location or combination of locations that may be remote from a casino, including an adjoining hotel or more distant property.

The gaming system 500 includes the gaming terminal 222. While the gaming terminal 222 could be a dedicated or special device which includes a game server, control module, display and other related components, the gaming terminal 222 might be configured as a controller-type device which can be connected to one or more common or standard devices. For example, the gaming terminal 222 might comprise a controller which is configured to connect to a standard electronic video display 505 (e.g. the gaming terminal 222 may essentially comprise a display 505 which is coupled to a game box). When employed in a hotel room, a home or the like, the display 505 may be a television, computer monitor or the like. In some embodiments, the display 505 may be a dedicated display that is usable only with the gaming terminal 222. The display 505 is capable of receiving signals that are representative of game information and game assets and graphics from the gaming terminal 222 and displaying the information, assets, and/or graphics to a user.

In some embodiments, the gaming terminal 222 and the display 505 may be used in a "display-only" mode that enables the user to view game status, progress, and/or results. For example, the user may have initiated a gaming session at a gaming terminal in the casino, and then returned to the user's hotel room to view the conclusion of the game, including any results and wagering outcomes. In such embodiments, the gaming terminal 222 may be associated with a hotel room, which in turn is associated with a hotel guest and the guest's games (e.g., via a player profile and/or a player's club identifier).

However, in exemplary embodiments, the user will interact with the gaming terminal 222 to play games or otherwise manipulate the contents of the display 505. In one embodiment, the user may use one or more input devices to communicate with the gaming terminal 222. Such input devices may be integral to the gaming terminal 222 (such as a dedicated keypad or the like), may be devices which can be selectively coupled to the gaming terminal 222 (such as a specialized button pad) or may be a general purpose device. For example, in one preferred embodiment, a mobile electronic device 510 is configured to communicate with the gaming terminal 222. In some embodiments, the mobile device 510 is a smart phone or tablet programmed to communicate with the gaming terminal 222. In some embodiments, the mobile device 510 is a dedicated gaming controller configured to interact with the gaming system 500. The mobile device 510 may include a software component, such as a mobile software application that can be downloaded to the player's mobile device, that facilitates the interaction with the gaming terminal 222. Alternatively, or additionally, the mobile device 510 may use a web browser or similar component to interact with the gaming terminal 222.

The mobile device 510 may be networked or otherwise communicatively and/or logically coupled with the gaming terminal 222 using a communication link 515 that may be wired or wireless such as Bluetooth, WiFi, the Internet, etc. The coupling and/or authentication process may include entering a pre-determined code using the mobile device 510 and/or reading, using the mobile device 510, a QR code displayed on the display 505. The communication link 515 is generally two-way, but may be one-way (e.g., such as with a television remote control). As a two-way communication channel, the gaming terminal 222 may receive inputs from the mobile device 510 (e.g., from a keyboard or touch screen) and send outputs to the mobile device for display to the user (e.g., to a display or touch screen). Outputs may also be sent to the display 505. As a one-way communication link, the communication link 515 may accept inputs from the mobile device 510 and the gaming terminal 222 may provide output using the display 505.

In the exemplary embodiment, the gaming terminal 222 is communicatively coupled with a network 520, which may be similar to the network shown in FIG. 4. The network 520 may be coupled to a casino system 525, which may be similar to casino server(s) and system 260, and one or more vendor game servers 530, which may be similar to vendor game server 244. As described herein, the casino system 525 may include a player loyalty or user account system. Such a system may enable a player to use credentials to log in and view or modify player profile information and previous or current game information.

In the exemplary embodiment, the gaming terminal 222 includes the game server 250 (not shown). In some embodiments, the gaming terminal 222 is communicatively coupled with the game server, such as game server 44, (not shown) via the network 520. The mobile device 510 is in communication with the game server 250 or 44, either directly (e.g., via the network 520) or indirectly (e.g., via the gaming terminal 222).

The mobile device 510 is programmed to send inputs to the game server 250 in order to manipulate any games being played on the game server 250. More particularly, the game server 250 may provide input options to the mobile device 510 for selection by the user. For example, the game server 250 may cause buttons to appear on the touch screen of the mobile device 510. The buttons may be particular to the game being played on the game server 250. During a video poker game, for example, the buttons may be HOLD, DRAW, MAX BET, etc. buttons, while relative to a slot-type game, the buttons might be SPIN, MAX BET, etc.

As described herein, the gaming terminal 222 shown in FIG. 5 includes the game process layer 200 and the system process layer 202. Accordingly, inputs are received from the mobile device 510 at the system process layer 202 and are communicated to the game process layer 200, being translated as required. Communication from the game process layer 200 to the mobile device 510 may happen directly or indirectly (i.e., through the system process layer 202). Communication between the game process layer 200 and the system process layer 202 occurs as described herein. More specifically, if the terminal control server 40 is remote from the gaming terminal 222, such communication passes through the remote terminal control server 40. If the terminal control server 40 is embedded in the gaming terminal 222 as the VLT/SBG module 252, then such communication passes through the VLT/SBG module 252. Regardless of where the communication passes or where translation happens, a division between the game process layer 200 and the system process layer 202 may be maintained such that the benefits of platform independence are achieved.

Additional games, game content, or game communications may be made available or facilitated by the vendor game server 530 via the network 520. For example, the gaming terminal 222 may download new games, or updates to currently stored games, from the vendor game server 222.

While only one mobile device 510 is shown, it is contemplated that a plurality of mobile devices may be used with the gaming terminal 222. Using more than one mobile device 510, two or more players may participate in the same game on the gaming terminal 222. Alternatively, or additionally, two or more players may participate in separate games that may be displayed using a split-screen on the display 505. Each mobile device 510 may be associated (e.g., via separate log-ins) with a different player profile or user account with the casino system 525. Accordingly, players may place wagers from their individual stored credits, and may receive winnings to their user account.

During operation, the user may play a game using the gaming terminal 222 and the mobile device 510. A gaming session may be commenced or continued using the gaming terminal 222. The user may supply identifying information using the mobile device 510 to the casino system 525 via the gaming terminal 222. The identifying information may be a username and password or other credentials that enable the casino system 525 to authenticate the user and associate the user with a user account. If no such user account exists, the user may play for free, without wagering money. In some embodiments, the user may be identified and/or authenticated based on the mobile device 510. For example, a unique identifier associated with the mobile device 510 may be associated with a user account. As is described herein, the user account may be associated with a plurality of credits that the user can use during wagering games. Once the user is logged in to the gaming terminal 222, the user may selectively resume previous games (e.g., games played previously on the same game terminal or elsewhere, such as in the casino) or commence a new game. The user may select from one or more games made available by one or more vendor game servers 530.

The user can see the game in progress on the display 505 and participate in the game using the mobile device 510. Buttons and/or other game content may be displayed on the mobile device 510. Such buttons and/or other game content may be downloaded to the mobile device 510 from the terminal server 222 and/or a content server (not shown), such as a web server, connected to the network 520. Alternatively, or additionally, game content may be included in the mobile app that is installed on the mobile device 510. The user may make wagers using the mobile device 510 and the casino system 525 may track and record wagers and outcomes. Thus, the user may accumulate credits or other winnings using the gaming terminal 222. The user may convert the credits to cash, or "cash-out", at the casino or elsewhere, including direct transfer to a bank account, third party payment systems, and other banking or financial systems. The user may use the mobile device 510 to add credits to the user account using any of a variety of payment methods now known or to be developed, including, but not limited to, prepaid cards, a web site, credit cards, embedded device chips like NFC, mobile point-of-sale, etc.

For example, the user may participate in interactive games such as video poker using the gaming terminal 222 and the mobile device 510. In another example, the user may wager on non-interactive games such as keno and lotteries using the gaming terminal 222 and the mobile device 510.

A particular advantage of this aspect of the invention is that the invention can be implemented by associating a gaming terminal 222 with an existing display device 505, such as a television in a room, whereby the in-room television essentially becomes a gaming device. This may be accomplished merely by associating a "box"-type gaming controller with the television.

Another advantage of this configuration of the invention is that a user's mobile device can be used as the input device to the gaming terminal 222. This avoids the need for the gaming terminal 222 to include one or more input devices (lessening the cost and complexity of the gaming terminal 222). In addition, the user's mobile device can be custom-configured, such as to provide graphical interfaces which are unique to particular games (rather than forcing the player to use one or more dedicated input devices which may not be well-suited to providing inputs for different types of games).

The system of the present invention has numerous advantages over the prior art. First and foremost, the gaming system and gaming terminals do not require vendors to create and supply game code in accordance with a proprietary and unique platform or turn over their game code to the operator of the system so that their code can be modified for use on the system. Instead, game vendors can generate and provide game code in accordance with one or more well known, public and/or non-proprietary protocols or configurations. In fact, different vendors may supply game code which utilizes different protocols. This is highly advantageous for a number of reasons. First, a game vendor can generate game code using well known protocols rather than unique and proprietary protocols. This results in substantial time savings because the game vendor need not learn a new and proprietary protocol or be required to create their game code in multiple variations using different protocols for different applications. Second, the vendor's game code can be used in conjunction with different gaming terminals and systems without having to be generated in multiple formats. For example, the vendor might create game code using Adobe FLASH for an online implementation and then provide that same game code for use on the gaming terminals of the present invention (without having to re-write the original game code to conform to some unique and different protocol just so the game can be offered on a gaming machine).

In addition, in accordance with one embodiment of the invention, the game vendor does not lose control of their game code. As a first aspect, the vendor's game code (or just game information associated therewith) can be directly provided by the vendor to the gaming terminals. As a second aspect, in a configuration where the gaming terminals report game activity through the vendor to the terminal control server, the vendor is able to store, view and/or audit game activity associated with their game code. For example, the vendor can then track how many times their games are played at each gaming terminal, the size of the player wagers, amounts won or lost, etc.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming terminal comprising:

a housing;

at least one display device configured to display wagering game information;

one or more peripheral components;

at least one controller comprising a game process layer configured to execute one of a plurality of different game applications configured based upon different game communication protocols and a separate system process layer configured to control said terminal, including said peripheral components, said game processes layer and system process layer utilizing a first operating protocol; and machine readable code fixed in a tangible medium and executable by said at least one controller configured to implement one or more integration communication protocols which permit communications between said game process layer and said system process layer, wherein said integration communication protocols are different for game applications which are configured based upon different game communication protocols, and which integration communication protocols allow game applications which utilize one or more second protocols which are not said first operating protocol to be implemented on said gaming terminal.

2. The gaming terminal in accordance with claim 1 further comprising machine readable code fixed in a tangible medium and executable by said at least one controller configured to execute a game server comprising an interface to said game process layer and a control server comprising an interface with said system process layer, wherein said one or more integration communication protocols are utilized between said game server and said control server.

3. The gaming terminal in accordance with claim 2 wherein said game server communicates with said game process layer via a game communication protocol.

4. The gaming terminal in accordance with claim 2 wherein said control server communicates with said system layer process via system communication protocol.

5. The gaming terminal in accordance with claim 2 wherein said integration communication protocol translates information between a game communication protocol utilized by one of said game applications and a system communication protocol utilized by said control server.

6. The gaming terminal in accordance with claim 1, wherein said gaming terminal is configured to communicate with a mobile device.

7. The gaming terminal in accordance with claim 6, wherein said gaming terminal is configured to receive game inputs from said mobile device.

8. The gaming terminal in accordance with claim 6, wherein said gaming terminal is configured to transmit game outputs to said mobile device.

9. The gaming terminal in accordance with claim 1 wherein said game applications are provided by different vendors.

10. The gaming terminal in accordance with claim 9 wherein said game applications are downloaded from different servers associated with said different vendors.

11. The gaming terminal in accordance with claim 2 further comprising at least one communication link between said control server and at least one external casino system.

* * * * *